United States Patent
Payne

[11] 3,747,105
[45] July 17, 1973

[54] POSITION DETERMINING SYSTEM FOR HELICOPTERS

[75] Inventor: Delmar V. Payne, Ferndale, Mich.

[73] Assignee: The Bendix Corporation, Southfield, Mich.

[22] Filed: Sept. 29, 1970

[21] Appl. No.: 76,411

[52] U.S. Cl. ... 343/112 R, 343/112 D, 343/113 DE
[51] Int. Cl. ................................................ G01s 5/02
[58] Field of Search .................. 343/112 R, 112 D, 343/113 DE

[56] References Cited
UNITED STATES PATENTS
3,144,646  8/1964  Breithaupt ................ 343/113 DE X
3,550,130  12/1970  Shaw ........................... 343/113 DE Primary Examiner—T. H. Tubbesing
Attorney—Harness, Dickey & Pierce, William F. Thornton and Plante, Hartz, Smith and Thompson

[57] ABSTRACT

A system for determining the position of a helicopter with respect to a remote transmitting antenna using at least one receiving antenna mounted on a blade of the helicopter to superimpose a doppler shift on a signal received from the remote transmitting antenna. Preferably, the helicopter also has a fixed antenna to provide a reference frequency. The system detects the blade rotational intervals between maximum positive, maximum negative and zero doppler shift to determine the range and bearing of the remote antenna with compensation for errors caused by maneuver of the helicopter.

32 Claims, 18 Drawing Figures

INVENTOR.
Delmar V. Payne
BY
William L. Anthony, Jr.
ATTORNEY.

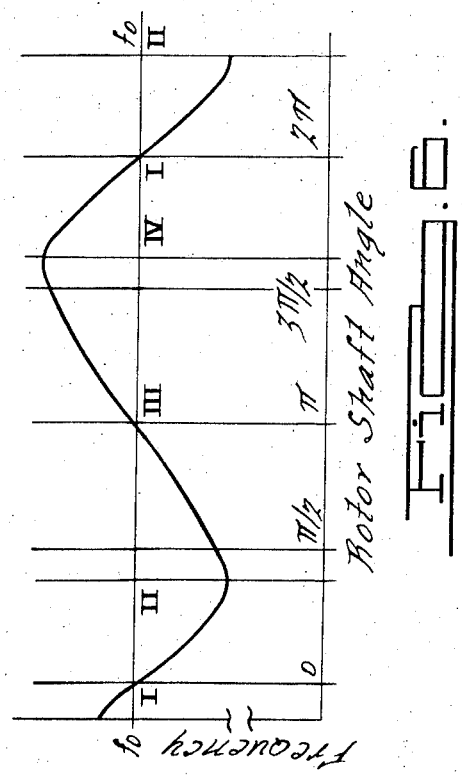
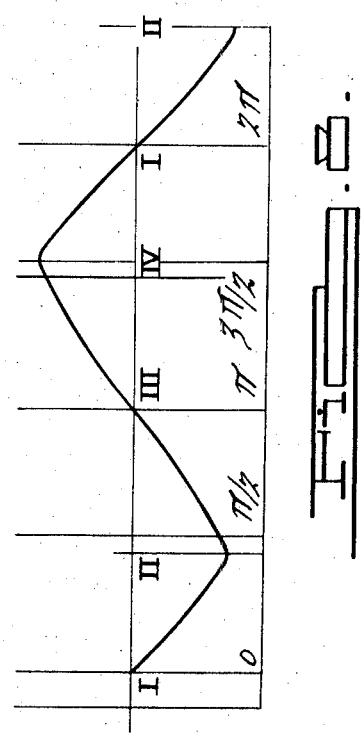
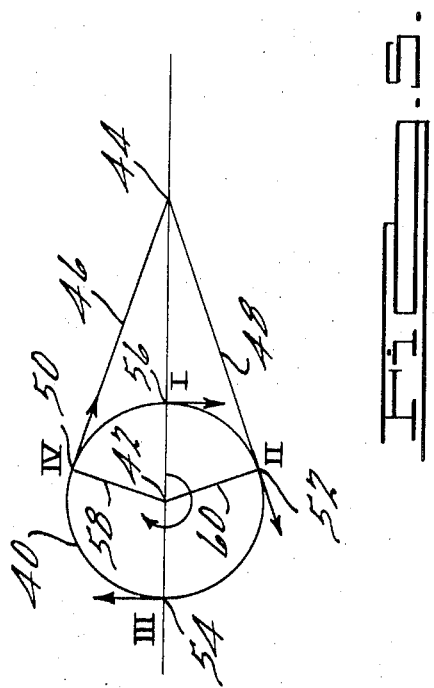
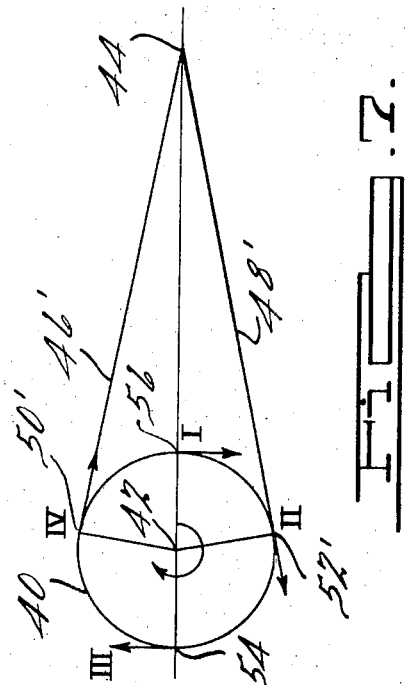
INVENTOR.
Delmar V. Payne
BY
William L. Anthony Jr
ATTORNEY.

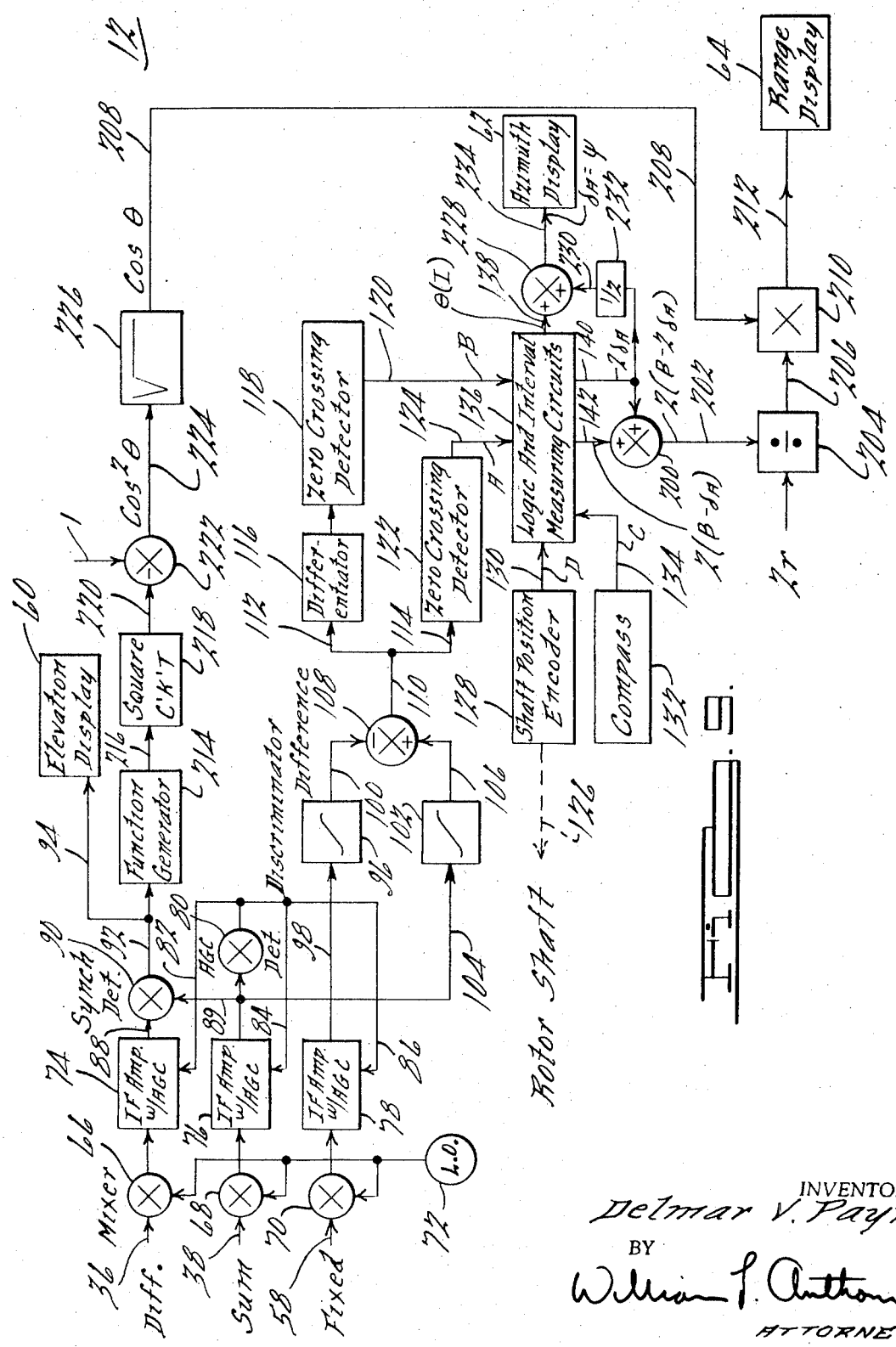

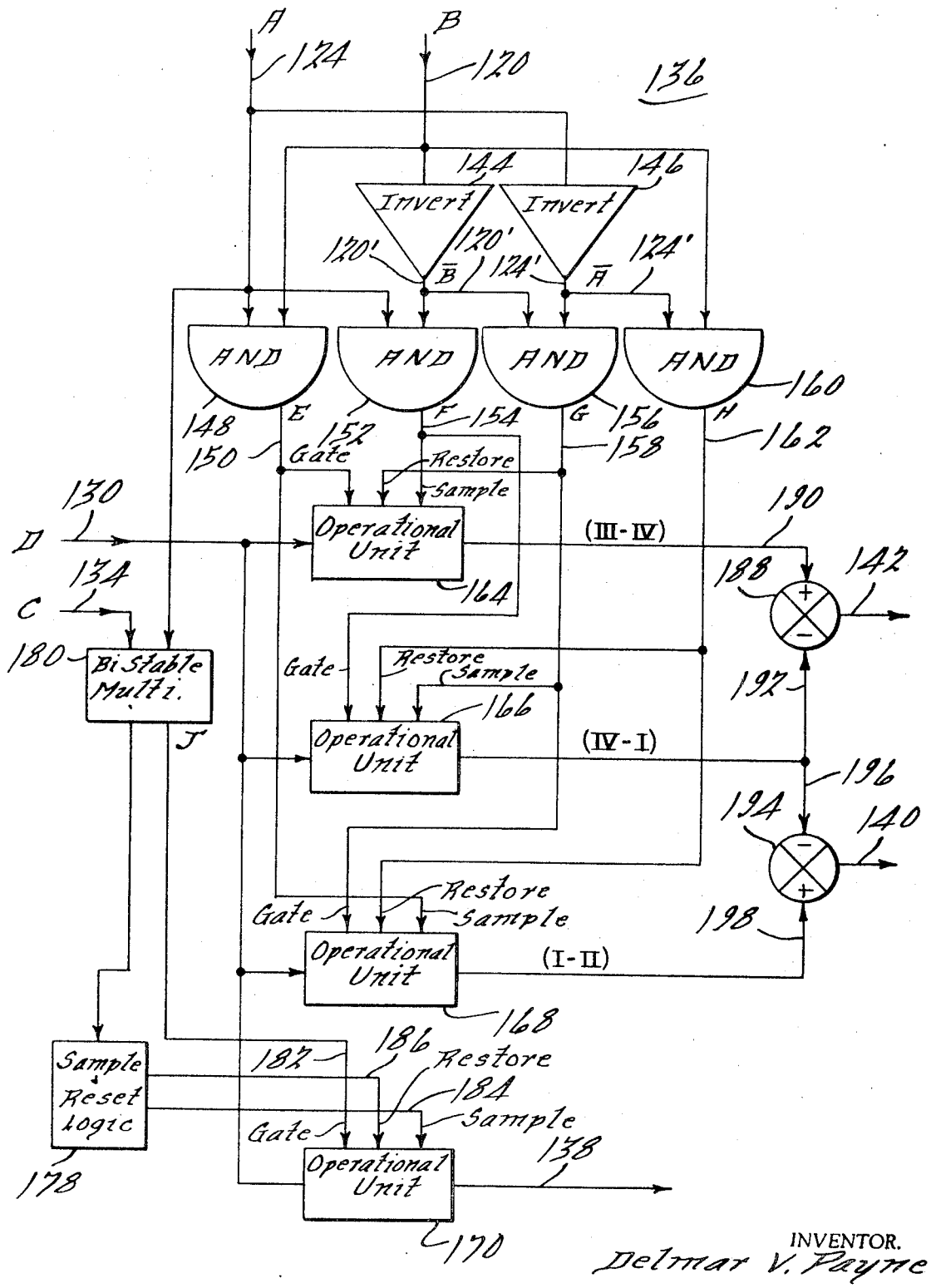

Remote Antenna 44

INVENTOR.
Delmar V. Payne
BY
William F. Anthony Jr.
ATTORNEY

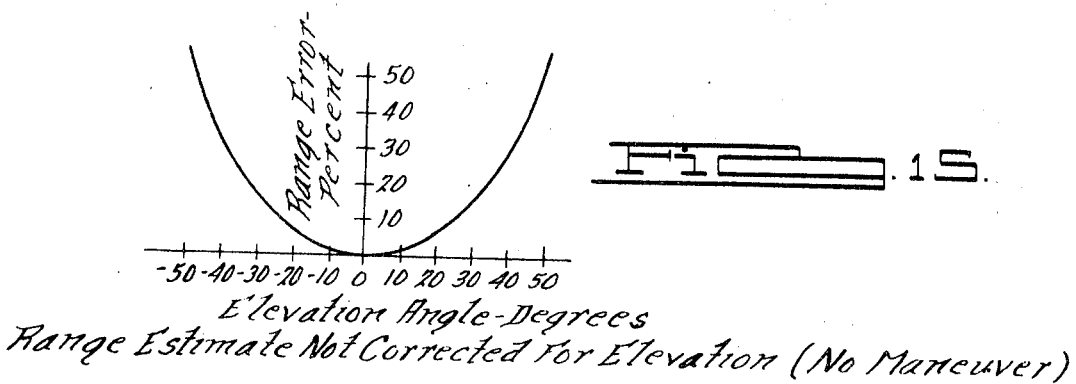

FIG. 15.

Range Estimate Not Corrected For Elevation (No Maneuver)

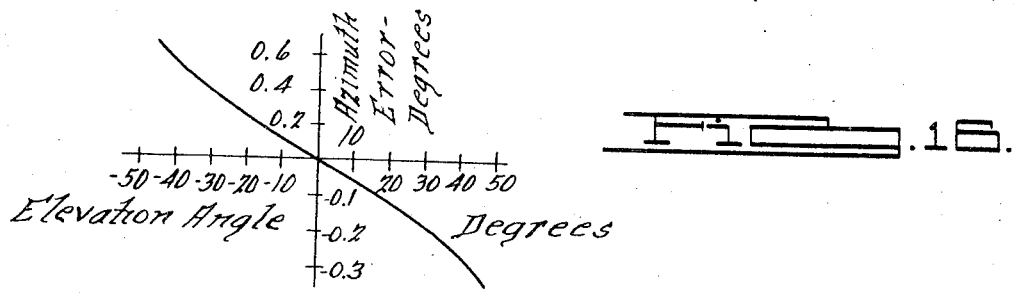

FIG. 16.

Maneuver Induced Azimuth Or Bearing Errors For Combined Rates Of $\dot{R}=20$ Ft/sec, $\dot{\theta}=20$ Deg/sec, And $\dot{\psi}=20$ Deg/sec

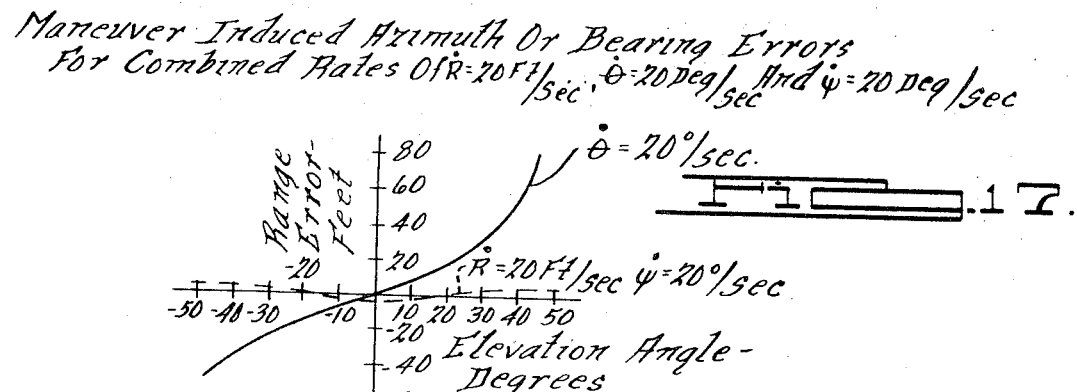

FIG. 17.

Maneuver Induced Range Error At $R=200$ Ft For Rates Of $\dot{R}=20$ Ft/sec

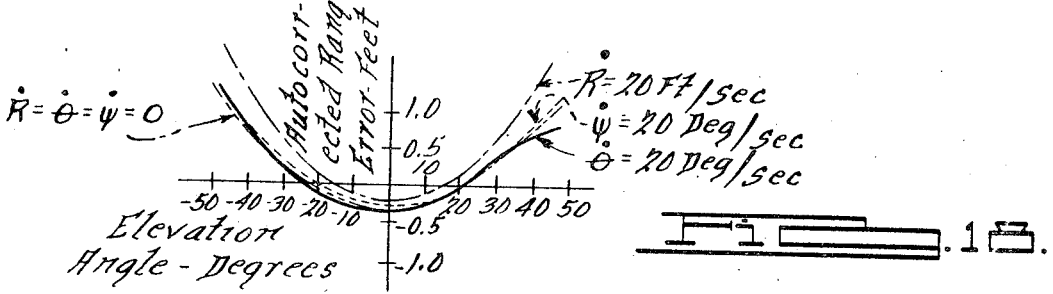

FIG. 18.

Maneuver Induced Range Error At $R=200$ Ft For Rates Of $\dot{R}=20$ Ft/sec (———), $\dot{\theta}=20$ Deg/sec (———), $\dot{\psi}=20$ Deg/sec (– – –) Error Without Maneuver (— ·· — ·· —) Autocorrected Range Errors INVENTOR.
Delmar V. Payne
BY
William P. Anthony
ATTORNEY.

3,747,105

POSITION DETERMINING SYSTEM FOR HELICOPTERS

BACKGROUND OF THE INVENTION

Various systems are known to the art for determining the bearing from a helicopter to a remote antenna transmitting a signal which uses a blade mounted antenna for superimposing a doppler shift on the signal received from the remote transmitting antenna. It is often desirable to further obtain information as to the range to the remote antenna, for example, in a system for determining the position of a helicopter in a formation of helicopters. Formations of helicopters are typically used in mass movement of troops and other supplies. These operations are presently limited to conditions under which visual contact may be made between the various helicopters in the formation. It would be of great advantage, particularly in combat operations, to be able to carry on such missions in weather conditions wherein visual contact cannot be established, or maintained. To provide such a capability, an effective means is required for determining the position of one helicopter of a formation to another helicopter of the formation, for example, the lead helicopter.

SUMMARY OF THE INVENTION

The present invention provides a position determining system for a helicopter having at least one receiving antenna mounted on a blade thereof for superimposing a doppler shift on a signal received from a remote transmitting antenna in combination with means for determining the asymmetry of the doppler-shifted signal with respect to blade rotation thereby providing a signal representative of the range from the helicopter to the remote transmitting antenna. More particularly, range is determined by comparing the complementary rotational intervals between maximum positive and maximum negative doppler shift, or rotational intervals related thereto, to provide a signal representative of range to the remote transmitting antenna.

The present invention further provides a system which compensates bearing and range measurements for errors induced by helicopter maneuvers by comparing at least three rotational intervals between the events of maximum positive doppler shift, maximum negative doppler shift, and zero doppler shift. Bearing and range measurements are also compensated for errors induced by elevation rates by establishing and utilizing predetermined relationships between elevation rate and elevation rate-induced azimuth and range errors.

Therefore, the present invention provides a system for determining the position of a helicopter with respect to a remote transmitting antenna to advantageously provide an all-weather formation-flying capability for helicopters. The system may alternatively be used as an all-weather landing system to guide a helicopter to a landing site by positioning the remote antenna at the landing site.

BRIEF DESCRIPTION OF THE DRAWINGS

FIG. 5 is a diagram showing the path of motion of the blade-mounted antennas of FIG. 2 in relation to the location of a remote transmitting antenna.

FIG. 6 is a chart of the frequency received by the blade-mounted antennas with respect to rotor shaft angle which illustrates the nature of the doppler shift induced by the motion of the helicopter blade.

FIG. 7 is a second diagram showing the path of motion of the blade-mounted antennas of FIG. 2 in relation to the location of a remote tramsmitting antenna.

FIG. 8 is a second chart of the frequency received by the blade-mounted antennas with respect to the rotor shaft angle which further illustrates the nature of the doppler shift induced by the motion of the helicopter blade.

FIG. 9 is a schematic illustration of an exemplary position determining system according to this invention.

FIG. 10 is a detailed illustration of a portion of the system of FIG. 9.

FIGS. 15–18 are charts illustrating exemplary maneuver-induced errors.

DETAILED DESCRIPTION OF THE PREFERRED EMBODIMENT

Figure 1:
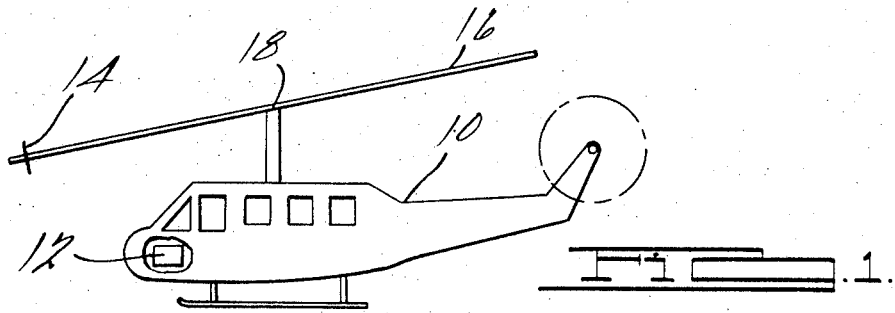
FIG. 1 is an illustration of a helicopter which is equipped with the positive determining system of this invention.

In FIG. 1, a helicopter 10 is shown having a position sensor 12 according to this invention. The position sensor 12 may be used to determine the position of the helicopter 10 with respect to another helicopter in a formation of helicopters, in a collison avoidance system, or as a landing aid. In each case, position is determined with respect to a remote transmitter antenna. The position sensor 12 is electrically connected by commutators (not shown) to a pair 14 of receiving antennas mounted on a blade 16. The position sensor 12 is also connected to a fixed antenna 18 on the hub of the helicopter rotor. The fixed antenna 18 may be placed alternatively on the fuselage of the helicopter 10. The antennas 14 and 18 are adapted to receive a signal from the remote transmitting antenna, which, in the case of the collision avoidance system or formation flight system, would be mounted on another helicopter. In the case of a landing system, the remote antenna would be located at the landing site.

The position sensor 12 provides signals, suitable for use by an output display or an autopilot, which are representative of range and azimuth of the helicopter with respect to the transmitting antenna and the elevation angle of the remote transmitting antenna with respect to the plane of the rotating blade 16.

Figure 2:
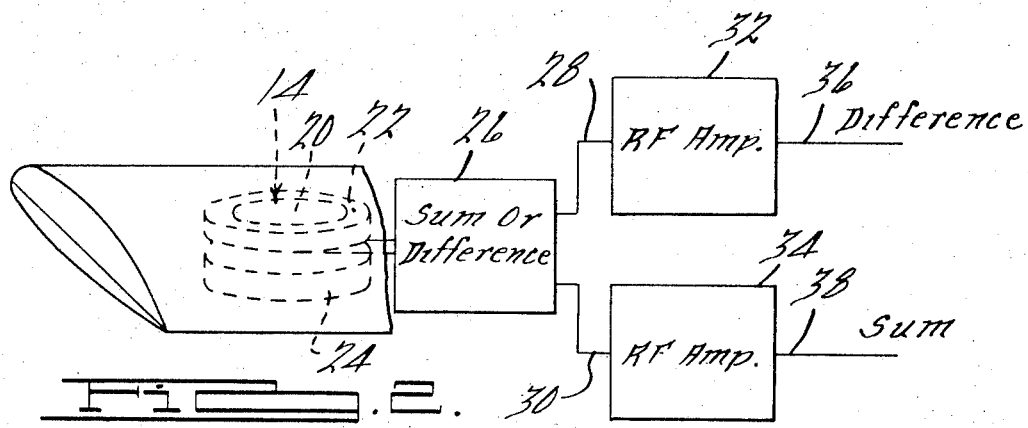
FIG. 2 is an illustration of a pair of blade-mounted receiving antennas and the circuitry associated therewith to provide output signals representiative of the sum and difference receiving modes of the antennas.
Figure 3:
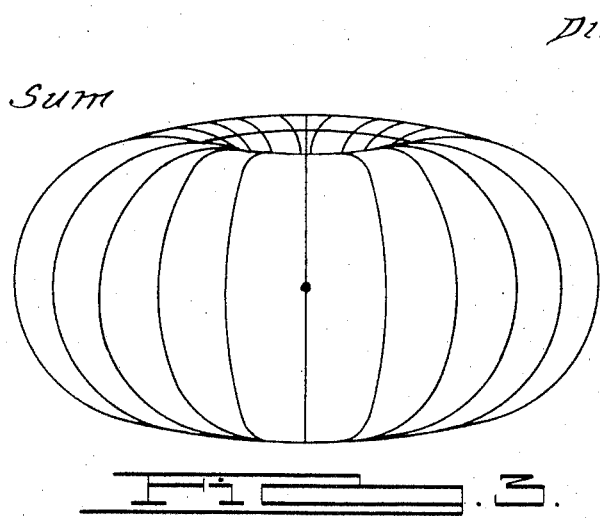
FIG. 3 is an illustration of the sum mode reception pattern of the pair of antennas shown in FIG. 2.
Figure 4:
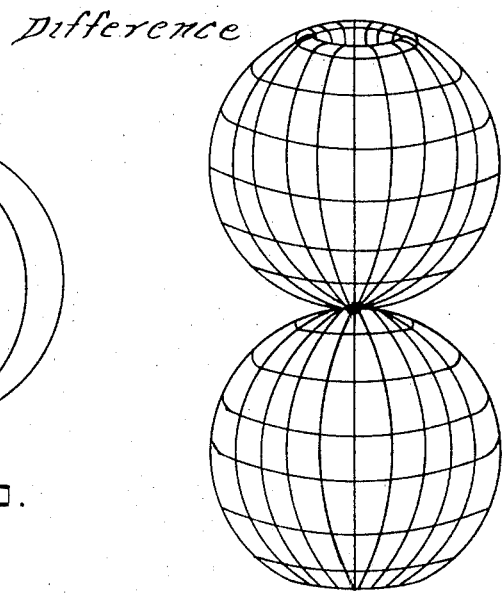
FIG. 4 is an illustration of the difference mode reception pattern of the pair of blade-mounted antennas shown in FIG. 2.

In FIG. 2, one extremity of the blade 16 is shown having the pair 14 of receiving antennas. Each antenna of the pair 14 is a tuned, annular slot antenna comprising, for example, a disk 20 and a cavity 22 located on the upper surface of the blade 16 as one antenna and a second disk (not shown) and cavity 24 located on the lower surface of the blade 16 as the second antenna. These antennas are described in Krause, "Antennas," McGraw Hill, 1950. The pair of antennas 14 may be connected in series with one polarity to produce a sum pattern as shown in FIG. 3, or with reversed polarity to produce a difference pattern as shown in FIG. 4. A hybrid junction 26 may be used for this purpose. The connections of antennas in this manner to produce sum and difference patterns is well-known in the art, and therefore, will not be explained in detail here. The hybrid junction 26 may take the form of a magic T or hybrid transformer as described on pages 306–308, Montgomery, Dicke and Pursell, "Principles of Microwave Circuits," Volume 8, Radiation Laboratory Series, McGraw Hill, 1948. The hybrid junction 26 provides a difference signal on line 28 and a sum signal on line 30 which are amplified by amplifiers 32 and 34, respectively, to provide an amplified difference signal on line 36 and an amplified sum signal on line 38.

The fixed antenna 18 may be a pair 14 of sum and difference antennas connected to provide a sum pattern as shown in FIG. 3, or it may be any other antenna providing a similar pattern.

With reference to FIGS. 5–8, the variation in the sum signal on line 38 as a function of the rotation of the blade 16 will be considered prior to the detailed discussion of the position sensor 12. As the pair 14 of blade mounted antennas move in a circular path so as to approach the remote transmitting antenna, an increase in received signal frequency will be experienced by virtue of the well-known doppler effect. The frequency of the received signal will reach a maximum when the velocity vector of the blade mounted antennas 14 is aligned with the remote antenna, i.e., at blade position IV (FIGS. 5 and 7). As the rotation of the pair 14 of antennas progresses so that their velocity vector is perpendicular with the respect to the line of sight of the remote antenna, i.e., at blade locations I (FIGS. 5 and 7), the frequency received by the antennas 14 will be exactly the same as the frequency of the signal transmitted from the remote antenna since there is no relative motion between the two. This is presuming, of course, that there is no relative motion between the helicopter 10 and the remote antenna. As the rotation of the blade 16 continues so that the antennas 14 are moving directly away from the remote antenna, i.e., at blade position II (FIGS. 5 and 7), a minimum of frequency is detected by the antenna 14, again due to the well-known doppler effect. Finally, as the rotation of the blade 16 has continued so that there is again no radial motion between the pair 14 of blade-mounted antennas and the remote antenna, i.e., at blade position III (FIGS. 5 and 7), a frequency is detected which is exactly equal to the frequency transmitted by the remote antenna. The frequency of the remote transmitting antenna can be readily obtained for comparison using the fixed antenna 18. It will be understood that the use of a helicopter mounted fixed antenna provides a reference signal and inherently compensates for doppler shift caused by radial velocity between the helicopter 10 and the remote transmitting antenna and changes in transmitting frequency.

Referring now particularly to FIG. 5, a circle inscribed by the blade mounted antenna 14 is shown. The center of the circle 42 represents the hub of the helicopter blade 16. The remote antenna is positioned at a location 44. Lines 46 and 48 are drawn illustrating the tangent locations 50 and 52 where maximum positive doppler shift and maximum negative doppler shift occurs (presuming a clockwise rotation of the helicopter blade 16 and no relative motion between the remote antenna and the hub of the helicopter blade 42). It also will be appreciated that zero doppler shift with decreasing signal frequency occurs at location 56 and zero doppler shift with increasing signal frequency occurs at location 54. Acordingly, the above locations 50, 52, 54 and 56 are the locations of the events IV, II, III and I, respectively.

The radial lines 58 and 60 are provided to show that the rotational interval IV–II between maximum positive and maximum negative doppler shift is smaller than the rotational interval II-IV between maximum negative and maximum positive doppler shift by virtue of the finite distance between the remote antenna 44 and the blade center 42. The disparity between the two rotational intervals increases as the distance between the hub 42 and the remote antenna 44 decreases, and visa versa. As a result of this relationship, a comparison of the frequency detected by the blade-mounted antennas 14 with the frequency detected by the fixed antenna 18 yields a distorted sine wave as shown in FIG. 6. The distortion of the sine wave is more apparent if a Fourier series of the waveform is analyzed. Particularly, it will be found that the magnitude of the second harmonic obtained, for example, by a bandpass filter, with respect to the fundamental varies inversely with respect to the range to the remote antenna 44.

Examining the chart of FIG. 5 more carefully, it will be seen that the rotational interval I–II is smaller than the rotational interval II–III and that the rotational interval III–IV is greater than the rotational interval IV–I. The term "rotational interval" is used to denote the sectors or segments of rotation of the helicopter blade 16, which, for constant rotational velocity, represents time.

Referring now to FIG. 6, a plot of frequency received by the blade-mounted antennas 14 versus rotor shaft position is shown. The frequency received by the fixed antenna 18 is shown as the abscissa $f_o$ to provide a reference with respect to which the doppler shift of the signal received by the blade-mounted antennas 14 may be measured. It can be seen from the chart of FIG. 6 that the points II and IV of maximum negative and positive doppler shift are displaced from the one-quarter rotation points $\pi/2$ and $3\pi/2$, respectively. It can also be seen that the leading rotational intervals I–II, IV–I, and IV–II are smaller than the corresponding trailing rotational intervals II–III, III–IV, and II–IV, respectively. As will be apparent in view of the discussion herein, the displacements of the points II and IV and disparity between the corresponding rotational intervals are representative of the sine wave asymmetry and are related to the range to the remote antenna. For convenience in the present system, the rotational intervals IV–I and III–IV are compared to determined range, although the complementary rotational intervals IV–II and II–IV or I–II and II–III could be suitably compared as well. In either case, the asymmetry of the signal received by the rotating antenna 14 is measured to determine range.

In FIG. 7, a plot of the rotational path of the blade-mounted antennas 14 with respect to the location of the remote antenna 44 is shown for an increased range condition. Under these conditions, the rotational interval IV–II more closely approaches the complementary rotational interval II–IV by virtue of the increased range. Accordingly, the distortion or asymmetry of the waveform shown in FIG. 8 decreases.

In summary, it will be appreciated that range may be detected by either measuring the relative magnitude of one of the leading rotational intervals IV–II, IV–I or I–II with respect to the magnitude of one of the trailing rotational intervals II–IV, II–III or III–IV or by measuring the magnitude of the second harmonic of a Fourier series with respect to the magnitude of the fundamental. In the preferred embodiment of the invention, the first method is used.

From FIGS. 5–8 it can be seen that the azimuth to the remote antenna 44 may be measured by detecting blade position when the following simultaneously occur: (1) the frequency received by the rotating antennas 14 is equal to the frequency received by the fixed antenna 18, and (2) the frequency detected by the rotating antenna is decreasing. The first condition defines the line of sight between the hub 42 and the remote antenna 44, and the second condition determines the fore or aft position of the remote antenna 44.

The sum and difference patterns illustrated in FIGS. 3 and 4, respectively, are used to measure elevation of the remote transmitting antenna with respect to the plane of the helicopter blades. The elevation angle of the remote transmitting antenna with respect to the plane of rotation of the helicopter blades is determined by dividing the signal received by the antennas connected in the difference mode by the signal received by the antennas connected in the sum mode.

Referring now to FIG. 9, the position sensor 12 receives a signal from the blade-mounted antennas 14 operating in the difference mode from RF amplifier 32 on line 36, a signal representative of the received signal of the blade-mounted antennas 14 operating in the sum mode from RF amplifier 34 on line 38, and a signal on line 58 from the fixed antenna 18. The position sensor 12 provides output signals representative of elevation, corrected azimuth, and corrected range, respectively, which may be used to operate an auto-pilot or a position display, for example, an elevation display 60, an azimuth display 62 and a range display 64.

The position sensor 12 includes a superheterodyne receiver circuit comprising mixers 66, 68, and 70, a local oscillator 72, and IF amplifiers 74, 76, and 78 which provides a narrow bandwidth signal as known in the radio receiver art, e.g., see pages 748–751, Terman, "Radio Engineering," Third Edition, McGraw Hill, 1947.

The output of the sum IF amplifier 76 is provided with an automatic gain control detector 80 to detect amplitude variations. The detected amplitude variations from the automatic gain control detector 80 is fed back into the automatic gain control sections of the IF amplifiers 74, 76, and 78 by connections 82, 84, and 86 to render the amplitude of the sum IF amplifier 76 constant; and in effect, to divide the difference signal magnitude by the sum signal amplitude at IF amplifier 74; and to divide the fixed signal amplitude by the sum signal amplitude at IF amplifier 78.

As stated previously, the signal on line 88 representative of the quotient of the signal received by the rotating antennas 14 operating in the difference mode and the signal received by those antennas operating in the sum mode is representative of the elevation of the remote transmitting antenna with respect to the plane of rotation of the helicopter blade 16. This signal is provided to a synchronous detector 90 by line 88. It will be appreciated that the signal on line 88 is representative of elevation, but does not, without further information, indicate whether the remote antenna is above or below the plane of rotation of the helicopter blade 16. This information is provided by the synchronous detector 90 which multiplies the constant amplitude signal from the sum IF amplifier 76 on line 89 by the quotient signal from the difference IF amplifier 74 on line 88 thereby providing an output signal on line 92 which is representative of the product of these signals. Since the amplitude of the signal on line 89 is constant, it will be appreciated that a signal on line 92 representative of the product of these signals will have an amplitude which is a function of the relative phase between the signal on line 89 and the quotient signal on line 88 and accordingly, is representative of whether the location of the remote transmitting antenna is above or below the plane of the rotating helicopter blade 16 as well as the elevation angle from the plane of the rotating blade 16 to the remote transmitting antenna.

The signal on line 92 which is representative of the elevation of the remote transmitting antenna with respect to the plane of the rotating helicopter blade 16, including the location of the remote antenna above or below the plane of the rotating helicopter blade 16, is provided to the elevation display 60 by an appropriate connecting line 94. This signal is of further use as a correction factor for range as will be explained hereinafter.

A first discriminator 96 is connected to the fixed antenna IF amplifier 78 by connecting line 98 to provide an output signal on line 100 which is representative of frequency variations of the signal received by the fixed antenna with respect to the IF center frequency of the IF amplifier 78. A second discriminator 102 is connected to the sum line 104 to provide an output signal on line 106 which is representative of frequency variations of the signal received by the rotating antenna with respect to its IF center frequency. The outputs of the discriminators 96 and 102 are adjusted so that equal frequency differences from IF center frequency yield equal output amplitudes. A difference amplifier 108 receives the signals from the discriminators 96 and 102 to provide an output signal on line 110 which is representative of the difference in these signals. By comparing the signals from the rotating antennas 14 and the fixed antenna 18 at amplifier 108, frequency changes which are caused by changes in frequency at the remote transmitter and most of the changes due to relative motion between the remote transmitter and the helicopter 10 are automatically compensated since these frequency changes are received equally by both the fixed antenna 18 and the rotating antenna 14. Therefore, the output of the summing amplifier 108 represents compensated frequency changes received by the rotating antenna 14 which are representative of doppler shift caused by the rotation of the blade 16.

The signal on line 110 is delivered by line 112 to a differentiator 116 and a zero crossing detector 118 to provide a signal on line 120 representative of the positive and negative peaks, i.e., maximum or minimum values of the signal on line 110. The difference signal is also delivered to zero crossing detector 122 to provide an output signal on line 124 representative of the zero crossings of the difference signal.

The system 12 includes a mechanical connection 126 from the main rotor shaft of the helicopter 10 to a shaft position encoder 128 which yields an output signal on line 130 representative of the position of the rotor shaft with respect to the longitudinal axis of the helicopter 10. For example, the shaft position encoder 128 may provide a plurality of angularly-related pulses. Since shaft position encoders are well known in the art, a specific description of the encoder 128 will not be provided. A compass 132 provides a signal on line 134 representative of the bearing or heading of the longitudinal axis of the helicopter 10 with respect to an external reference, for example, magnetic north or true north. The signals from the zero crossing detectors 118 and 122, the rotor shaft position encoder 128, and the compass 132 are supplied to the logic and interval measuring circuit 136.

Figure 11:
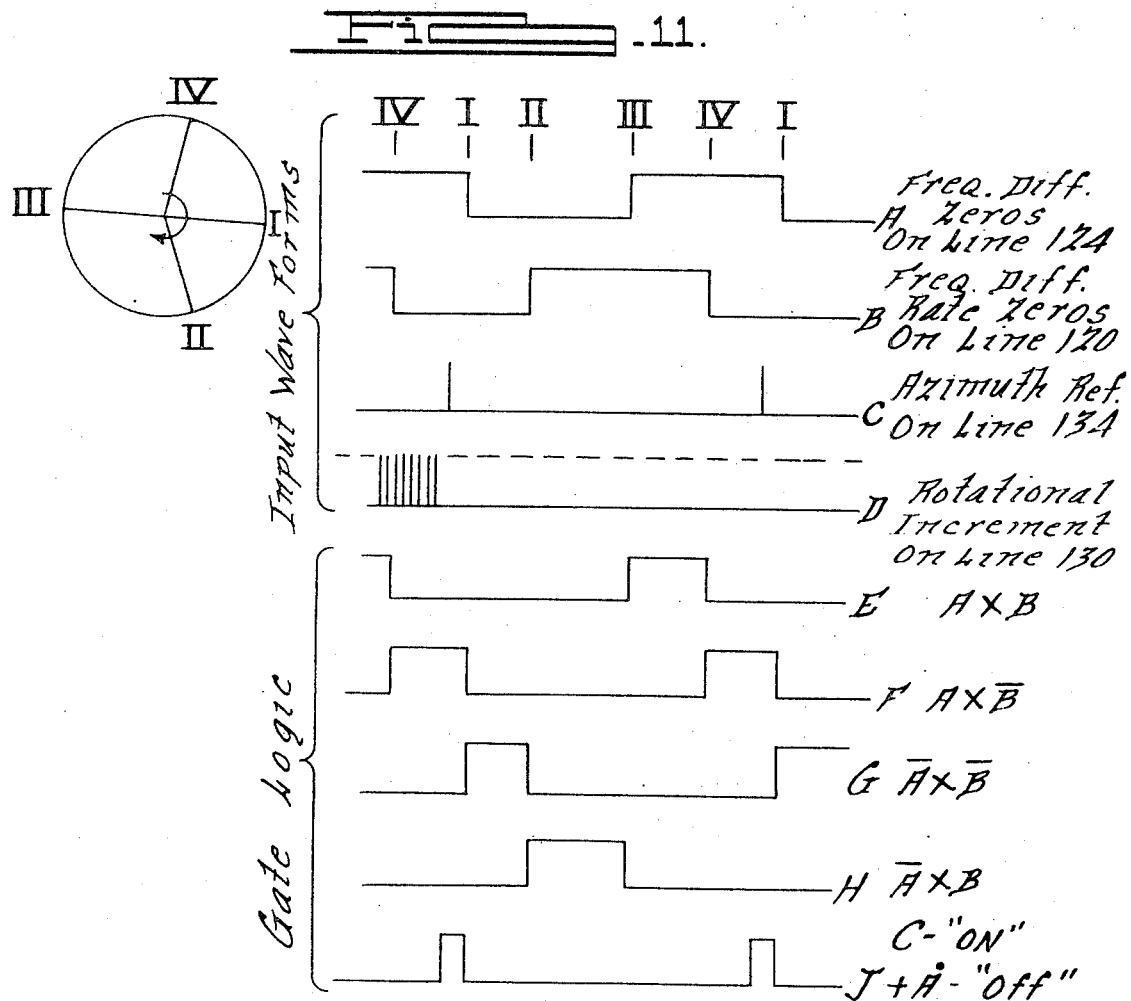
FIG. 11 is a chart of several signals which illustrate the operation of the system of FIG. 9.

In FIG. 10, a schematic of the logic and interval measuring circuit 136 is shown. The logic and interval measuring circuit 136 provides a signal on line 138 representative of uncorrected azimuth to the transmitting antenna, a singal on line 140 representative of azimuth correction, and a signal on line 142 relating to partially corrected range to the transmitting antenna. Essenitally, the logic and interval measuring circuit 136 measures the rotational sectors I, II, III, and IV so as to permit computation of the corrected range and azimuth to the transmitting antenna. To facilitate an understanding of this invention, the functioning of the logic and interval measuring circuit 136 will be explained with reference to FIG. 11 in which representative waveforms of input, intermediate and output signals are illustrated. With reference now to FIG. 11, a representative input signal (A) for line 124 is shown in the form of a rectangular wave with step voltage changes located at the zeros of the waveforms of FIGS. 6 and 8. A second input signal (B) on line 120 is shown in the form of a rectangular waveform having step voltage changes at the locations of the maximum and minimum of the waveforms of FIGS. 6 and 8. A third input signal (C) on line 134 is shown having reference marks which may represent, for example, true north or magnetic north as a function of blade position. A fourth input signal (D) on line 130 is in the form of a plurality of pulses representative of preselected angular increments of rotation of the rotor of the helicopter 10. The increments may be in fractions of degrees or fractions of radians.

Referring to FIGS. 10 and 11, inverters 144 and 146 are provided to convert the signal (B) on line 120 and the signal (A) on line 124, respectively, to opposite polarity to constitute NOT signals on lines 120' and 124' for use in subsequent logic circuits. A first AND circuit 148 provides an output signal (E) on line 150 representative of the coincidence of the signals on lines 124 and 120 which has a duration equal to sector III - IV. A second AND circuit 152 provides an output signal (F) on line 154 representative of the coincidence of a signal on line 124 and a NOT signal on line 120' having a duration representative of the sector IV - I. A third AND circuit 156 is provided to yield an output signal (G) on line 158 representative of NOT signals coinciding on lines 124' and 120' having a duration representative of the sector I - II. A fourth circuit 160 is provided to yield an output signal (H) on line 162 representative of the NOT signal on line 124' coinciding with a signal on line 120 having a duration representative of the sector II - III.

Figure 12:
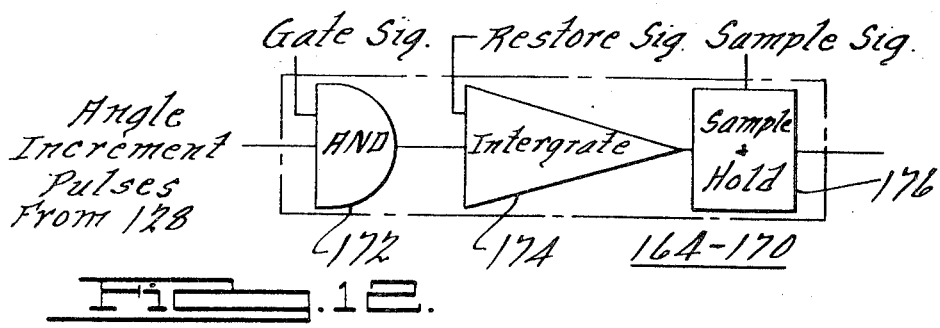
FIG. 12 is a more detailed circuit diagram of a portion of the circuit of FIG. 10.

The logic and interval measuring circuit is further provided with three operational units 164, 166, and 168, an exemplary embodiment being shown in detail in FIG. 12. With reference now to FIG. 12, an exemplary operational unit can be seen to comprise an AND circuit 172 which receives the pulses from the shaft position encoder 128 on line 130 and a gate signal from a respective one of the AND circuits 148, 152, 156, or 160; an integrating circuit 174 which receives the output of the respective AND circuit 172, and a restore signal from another of the AND circuits 148–160; and a sample and hold circuit 176 receiving the output of the integrating circuit 174, and a sample signal either from still another of the AND circuits 148-160 or from the sample and reset logic circuit 178 as will be apparent in view of FIG. 10.

With additional reference now to the connections for operational unit 164 illustrated in FIG. 10, it can be seen that the AND circuit 172 thereof passes pulses from the shaft position encoder 128 so long as there is a signal from the AND circuit 148. As shown previously, the signal from the AND circuit 148 is representative of the rotational segment III - IV of the rotation of the rotor. Accordingly, the number of pulses from the AND circuit 172 is representative of the magnitude of the interval III - IV. This number is effectively counted by the integrating circuit 174 to provide a signal having a magnitude equal to the number of pulses, and accordingly, equal to the interval III - IV. The magnitude of this signal is sampled and stored by the sample and hold circuit 176 for delivery upon the occurrence of a sample signal from the AND circuit 152.

Referring now to operational unit 166, it can be seen that pulses from the shaft position encoder 128 are passed through the AND circuit 172 thereof so long as there is a signal on line 154 from the AND circuit 152. As explained previously, this signal is present during the rotational interval IV - I. Therefore, the number of pulses which are passed is in proportion to the length of this interval. The integration circuit 174 of the operational unit 166 provides a signal having a magnitude equal to the interval IV - I. The sample and hold circuit 176 samples this amount and stores the amount for delivery upon the occurrence of a sample signal from the AND circuit 156.

Referring now to the operational unit 168, it can be seen that an output signal is developed at the integrating circuit 174 thereof representative of the rotational duration of a signal from the AND circuit 156 which duration, as explained previously, is representative of the magnitude of the sector I - II. This signal is stored for delivery upon the occurrence of a sample signal from the AND circuit 148.

The final operational unit 170 provides a signal representative of the bearing of the remote transmitting antenna from the helicopter by measuring the rotational interval between the occurrence of an index pluse C from the compass 132 to predetermined rotor alignment with the remote transmitting antenna. The interval is measured by counting the pulses from the shaft position coder 128 between the occurrence of the index pulse C and the predetermined alignment of the rotor with the remote transmitting antenna. The count is obtained by turning on a bistable multi-vibrator 180 using the index pulse C and turning off the multi-vibrator 180 using the trailing edge of signal A on line 124. During the period in which the bistable multi-vibrator is on producing a gate pulse on line 182, pulses from the shaft position encoder 128 are counted by the integrating circuit 174 of the operational unit 170. The sample and hold circuit 176 thereof samples and stores the total until occurrence of a pulse on line 184 from the sample and reset logic 178. The sample and reset logic 178 may take the form of a monostable multi-vibrator which commands a sample when the bistable multi-vibrator 180 returns to its initial stable state, and thereafter, commands a restore pulse on line 186 when the monostable multi-vibrator 180 again returns to its initial stable state. The output signal on line 138 of the operational unit 170 represents uncorrected direction or bearing to the remote transmitting antenna with respect to the index pulse C.

An amplifier 188 receives the output signal from operational unit 164 on line 190 and the output signal from operational unit 166 on line 192 and provides an output signal on line 142 representative of the difference in the rotational sector III – IV and the rotational sector IV – I which, as is apparent in view of the charts of FIGS. 5 and 7, represents the asymmetry of the frequency rotational variation of the received signal. As stated previously, this difference represents uncorrected range to the remote transmitting antenna. A second amplifier 194 receives the signal from operational unit 166 on line 196 and the signal from operational unit 168 on line 198 and provides a signal on the output line 140 representative of the difference between the rotational sector I – II and the rotational sector IV – I which, as also stated previously, represents maneuver induced errors.

Prior to the discussion of the actual manner in which maneuver induced errors are corrected, the origin and nature of these errors will be investigated. To aid in the analysis of maneuver induced errors, a mathematical model of the geometrical relationships of the rotating and fixed receiving antennas 14 and 18, respectively, and the transmitting antenna 44 will be presented. The azimuth and range coordinates of the transmitting antenna 44 with respect to the main rotor path or disc of a helicopter are derived from analysis of the periodic change in frequency of the signal received by the blade mounted antenna 14 as it rotates about the hub and a comparison of this frequency with that of the signal received by the fixed antenna 18. An interval in the history of the two frequencies is represented in FIGS. 6 and 8. The geometry of importance to the operation of the position sensor system 12 is that of the receiving and transmitting antennas. For the purpose of this analysis, it is assumed that the helicopter body-fixed receiving antenna 18 is located on the rotor hub and that the blade mounted antenna moves in a plane through the hub. Since there is only one transmitting antenna 44, no assumptions need be made about its location except that it be such that coverage over reasonable azimuth (360°) and elevation (±45°) angles be assured and, if on another helicopter, be body-fixed.

Figure 13:
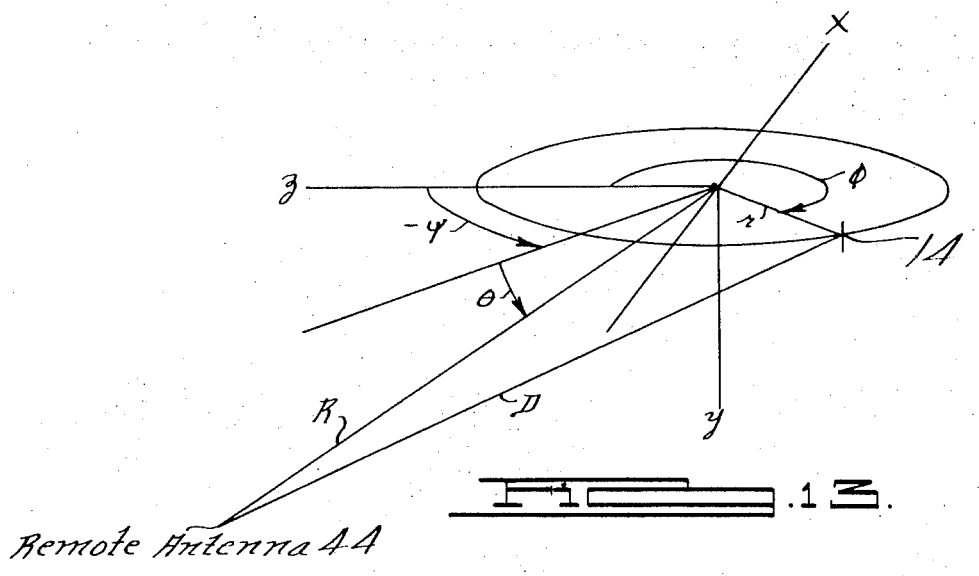
FIG. 13 is a diagram of the geometric relationship between the blade-mounted antennas and the remote transmitting antenna.

A geometry appropriate to the derivation of a mathematical model of the position sensor system 12 is shown in FIG. 13. If the origin of coordinates is the rotor hub and range is measured from the hub to the transmitting antenna, then the range vector, $\vec{R}$, can be written $$\vec{R} = \vec{i}R \cos \theta \sin \psi + \vec{j}R \sin \theta + \vec{k} R \cos \theta \cos \psi \tag{1}$$

where $R, \vec{R}$ are the range and range vector, respectively
$\psi$ is the azimuth angle of the transmitting antenna 44
$\theta$ is the elevation angle of the transmitting antenna 44
$\vec{i}, \vec{j}, \vec{k}$ are unit vectors in the directions of positive $x$, $y$, $z$, respectively. The position vector, $\vec{r}$, of the receiving antenna 14 on the blade tip is $$\vec{r} = \vec{i} r \sin\phi + \vec{k} r \cos\phi \tag{2}$$

where $r$ is the distance from hub to blade-tip antenna 14
$\phi$ is the angle through which the blade has rotated from reference direction $\vec{k}$. The distance, $D$, from the blade-tip antenna 14 to the transmitting antenna 44 is derived from $$D^2 = (\vec{R} - \vec{r}) \cdot (\vec{R} - \vec{r}) \tag{3}$$

Substitute equations 1 and 2 into 3 to obtain, after combining terms, $$D^2 = R^2 + r^2 - 2Rr \cos(\psi - \phi) \cos \theta \tag{4}$$

If a signal with angular frequency $\omega T$ is transmitted through remote antenna 44, the equations of phase of signals $E_H$ and $E_B$ received by hub 18 and blade antennas 14 are $$E_H = \exp j(\omega T t - kR), \; E_B = \exp j(\omega T t - kD) \tag{5}$$

where $k$ is the wave number, $k = 2\pi/\lambda$. The angular frequencies of $E_H$ and $E_B$ are the rates of change of phase. That is $$\omega H = \omega T - k\dot{R}, \; \omega_B = \omega T - k\dot{D} \tag{6}$$

The doppler difference frequency, $\omega$, is $$\omega = \omega_B - \omega_H = -k(\dot{D} - \dot{R}) \tag{7}$$

The difference frequency is zero when $$\dot{D} - \dot{R} = 0 \tag{8}$$

Substitute equation 4 into equation 8 and find $$[D - R + r \cos \theta \cos(\psi - \phi)] \dot{R}$$
$$= Rr [(\dot{\psi} - \dot{\phi}) \cos\theta \sin(\psi - \phi) + \dot{\theta} \sin\theta \cos(\psi - \phi)] \tag{9}$$

If there is no maneuver, then the roots of equation 9 are $$\phi = \psi - n\pi, \quad n = 0, \pm 1, \pm 2, \ldots \quad (10)$$

That is, for no maneuver, the direction to the remote transmitting antenna 44 is found by measuring rotor shaft position when $$\omega = 0 \text{ and } \dot{\omega} < 0 \text{ (} n \text{ an even integer)} \quad (11)$$

Small errors in the measurement of azimuth angle can occur because some or all of $\dot{R}$, $\dot{\theta}$ and $\dot{\psi}$ are non-zero. Maneuver induced errors may be approximated by substituting a truncated series solution for $D$ (in equation 4) into equation 9. The roots of the resulting equation are values of $\phi$ for which $$(\dot{\phi}-\dot{\psi})\cos\theta \sin(\psi-\phi) = \dot{\theta}\sin\theta\cos(\psi-\phi) - r\dot{R}[1-\cos^2\theta\cos^2(\psi-\phi)]/2R^2[1 - r/R\cos\theta\cos(\psi-\phi)] \quad (12)$$

Since $|\dot{\theta}|, |\dot{\psi}| << \dot{\phi}$ and it is assumed that $-45° < \theta < 45°$, the roots of equation 12 must be near the values of $\phi$ in equation 10. Using the small angle approximation of the sine function of $(\phi-\psi)$, it is found that the azimuth angle of the remote transmitting antenna 44 will be approximated by procedures summarized in equation 11 as $$\phi = \psi - \tan\theta \left[\dot{\theta}/\dot{\phi}(1 + \dot{\psi}/\dot{\phi}) - F\dot{R}/2R\dot{\phi}\sin\theta(1 + F\cos\theta)\right] \quad (13)$$

where the ratio $F = r/R$ has been used. Maneuver has introduced an error, $$\delta_A = -\dot{\theta}/\dot{\phi}\tan\theta - \tan\theta[\dot{\theta}\dot{\psi}/\dot{\phi}^2 - F\dot{R}/2R\dot{\phi}\sin\theta(1 + F\cos\theta)] \quad (14)$$

into the detection of $\psi$.

Range to the remote transmitting antenna 44 is derived from the unequal separation of successive maxima and minima of $\omega$ in equation 7. These events are the roots of $$\ddot{D} - \ddot{R} = 0 \quad (15)$$

In the case of no relative maneuver and no lead-lag hinge, the solution of equation 15 is $$\cos(\psi-\phi) = R^2+r^2 - [(R^2+r^2)^2 - 4R^2r^2\cos^2\theta]^{1/2}/2Rr\cos\theta \quad (16)$$

It is noted that the values of $(\psi-\phi)$ which satisfy equation 15 are near $\pm\pi/2$. This is easily demonstrated by a series expansion of equation 16.

$$\cos\alpha = F\cos\theta/1 + F^2 [1 + (F\cos\theta/1 + F^2)^2 + 2(F\cos\theta/1 + F^2)^4 + \ldots] \quad (17)$$

where $\alpha = \omega - \phi$ has been used. Since, $0 \leq F < \frac{1}{2}$ and $|\cos\theta| \leq 1$, the series is convergent. Terms in brackets are in order of decreasing importance. For F sufficiently small, and in the absence of maneuver, range may be approximated by $$R = r\cos\theta/\cos\alpha \quad (18)$$

In order to arrive at a reasonable series approximation for range error under conditions of maneuver, assume that $\dot{R}/R$, $\dot{\psi}$, and $\dot{\theta}$ are of the order of $F$; that $\ddot{R}/R$, $(\dot{R}/R)$, $\dot{\theta}\dot{\psi}$, $\dot{\theta}\dot{R}/R$, $\dot{\psi}\dot{R}/R$ and $\dot{\theta}\dot{\psi}$ are of the order of $F^2$; etc. Assume, as before, that there is no lead-lag hinge ($\ddot{\phi} = 0$). It is found that the solution to equation 15 is $$\cos(\psi-\phi) = \cos\alpha - 2/\dot{\phi}[\dot{\theta}(\tan\theta - F^2\sin\theta) - F\dot{\psi}(1 - \cos\theta) + F^2\dot{R}/R\cos\theta] \quad (19)$$

where $\cos\alpha$ is given by equation 17. The angle $(\psi-\phi)$ for which equation 15 is satisfied differs from $\alpha$ by approximately the second term on the right-hand side of equation 19. This follows from the expansion of $\cos(\alpha+\delta_R)$ and use of the approximation $\sin\alpha \cong 1$.

$$\cos(\alpha+\delta_R) = \cos\alpha\cos\delta_R - \sin\alpha\sin\delta_R \cong \cos\alpha - \delta_R \quad (20)$$

By equations 19 and 20, it is seen that $$\delta_R = 2\dot{\theta}/\dot{\phi}\tan\theta - 2[F^2\dot{\theta}/\dot{\phi}\sin\theta + F\dot{\psi}/\dot{\phi}(1-\cos\theta) - F^2\dot{R}/R\dot{\phi}\cos\theta] \quad (21)$$

A comparison of equations 14 and 21 discloses that, to a first approximation, $$\delta_R \cong -2\delta_A \quad (22)$$

since terms other than those involving $\dot{\theta}/\dot{\phi}$ are small.

Figure 14:
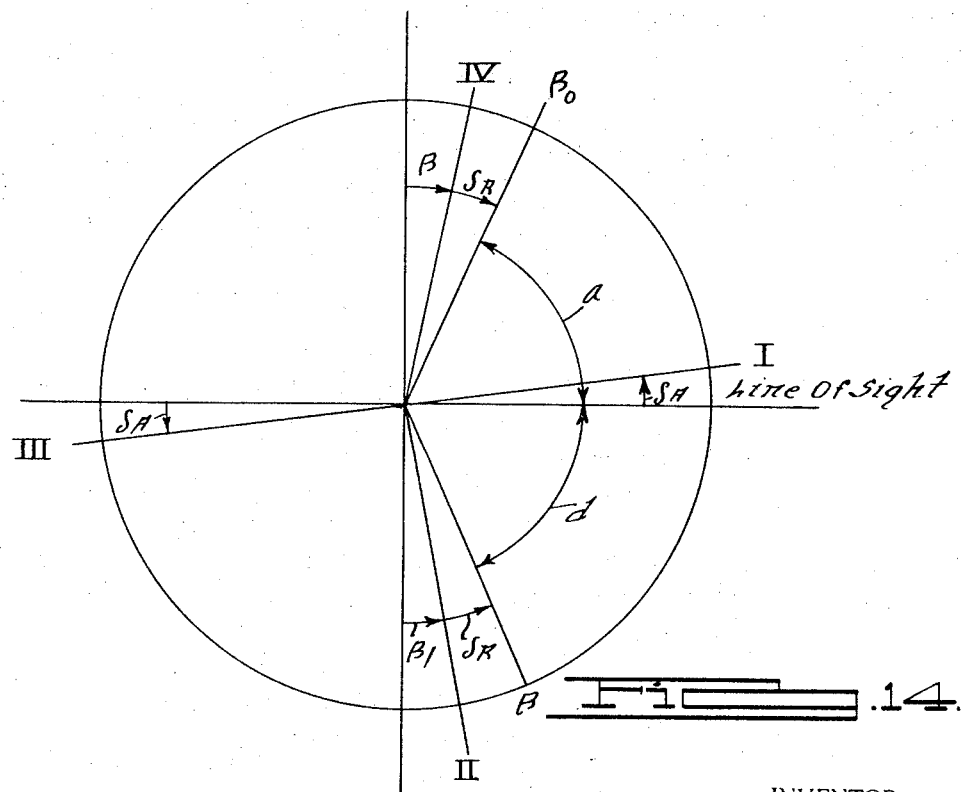
FIG. 14 is a diagram of the rotational path of the blade-mounted antennas illustrating the conventions for maneuver-induced errors which are detected by the system of this invention.

The relationships existing among measurable events I, II, III and IV, corresponding to equations 8 and 15, and angles $\alpha$, $\delta_A$ and $\delta_R$ are shown in FIG. 14. Also shown in this figure are angles $\beta_o$ and $\beta$. The first angle, $\beta_o$, is the complement of $\alpha$. Since $\alpha$ is near $\pm\pi/2$, $$\cos\alpha = \sin\beta_o \cong \alpha_o \quad (23)$$

and, from equation 20, it is seen that $$\beta = \beta_o - \delta_R \quad (24)$$

Events I and III are identified by the realization of conditions $(\omega=0, \dot{\omega}<0)$ and $(\omega=0, 0<\dot{\omega})$, respectively. Events II and IV are realized when conditions $(\dot{\omega}=0, 0<\omega)$ and $(\dot{\omega}=0, \omega<0)$, respectively, are satisfied. Angles $\beta$ and $\delta_A$ may be computed from angular intervals between these successive events. That is $$-2\delta_A = (I-II)-(IV-I) = (III-IV)-(II-III) \quad (25)$$

$$2(\beta + \delta_A) = (II-III)-(I-II) \quad (26)$$

$$2(\beta - \delta_A) = (III-IV)-(IV-I) \quad (27)$$

The angular interval from, for example, event I to event II is denoted by the term (I–II) in the above equations. The definitions of other terms are similar.

Equations 25, 26, and 27 are sufficient to correct the apparent bearing of the remote transmitting antenna 44 and to permit use of the simple ranging equation 18 by first approximating $\beta_o$. From equations 11, 13 and 14, it is seen that $$\psi = \phi - \delta_A \quad \text{when } \omega = 0 \text{ and } \dot{\omega} < 0 \quad (28)$$

The procedure for determining the bearing of the remote transmitting antenna 44 is that of recording rotor shaft position on realization of event I and adding one-half the value of equation 25 to this reading. An approximate value for $\beta_o$, the value of $\beta$ under conditions of no relative manuever, is obtained by substituting equation 22 into equation 24 to obtain $$\beta_o \cong \beta - 2\delta_A \quad (29)$$

The corresponding operation, involving equations 25 and 27, is that of taking one-half their sum. Once $\beta_o$ is found, equations 18 and 23 may be used to approximate range to the remote transmitting antenna 44 by $$R \cong r\cos\theta/\beta_o \quad (30)$$

An appreciation of the importance of elevation angle to the range approximation and of maneuver induced errors to both the bearing and range approximations may be obtained by referring to FIGS. 15, 16, 17, and 18. FIG. 15 shows that range errors, in the absence of maneuver, can become very large for non-zero elevation angles if correction for elevation angle were omitted. Therefore, the factor $\cos \theta$ must be included in the range equation to prevent large errors. Maneuver induced errors of bearing are not large for reasonable helicopter maneuver rates. This is shown in FIG. 16. These errors, therefore, are preferably compensated as described. It can be seen that this angular error is, by virtue of equation 22, nearly one-half the difference between $\beta_o$ and $\beta$ which value is preferably used as the correction factor. Maneuver can introduce significant error in the computation of range as is shown in FIG. 17 and are preferably compensated as described. Certain minor errors remain which are not of practical significance. For example, in FIG. 17, range was computed by equation 30 after making the generally inaccurate approximate identification: $\beta \cong \beta_o$, which is corrected by the system of this invention. FIG. 18 illustrates the residual errors remaining after $\beta_o$ is approximated by the method detailed in the preceding paragraph. These errors are almost identical to errors resulting from the approximations employed in deriving equation 30. This is seen by comparing the error curve for the condition of no maneuver ($\dot{R} = \dot{\theta} = \dot{\psi} = 0$) with all other curves in that figure.

With regard again to FIG. 9, the manner in which maneuver induced errors are corrected will be explained. The signal on line 142 which is representative of the difference in the intervals III − IV and IV − I, and according to equation 27 above, which is also representative of $2(\beta - \delta_A)$, is delivered to a summing terminal of a summing amplifier 200. The signal on line 140 which is representative of the difference in intervals I − II and IV − I, and according to equation 25, which is also representative of $-2\delta_A$, is delivered to another summing terminal of the summing amplifier 200. The result of a summation of these signals by the summing amplifier 200 is a signal on line 202 representative of $2(\beta - 2\delta_A)$. With regard now to equation 22, it can be seen that $-2\delta_A$ is approximately equal to $\delta_R$. Accordingly, the signal on line 202 is approximately equal to $2(\beta + \delta_R)$. According to a transposition of equation 24, $\beta_o = \beta + \delta_R$, and consequently, the signal on line 202 is approximately equal to $2\beta_o$. This signal is supplied to a dividing logic circuit 204 which divides the signal on line 202 into a constant 2r representative of twice the distance of the hub of the helicopter to the blade mounted antenna to provide a signal on line 206 approximately representative of $r/\beta_o$. The signal on line 206 is multiplied by a signal representative of cosine $\theta$ on line 208 at a multiplying amplifier 210 to provide a signal on line 212 representative of the corrected range to the remote transmitting antenna 44 in accordance with equation 30. The signal on line 212 may be used by a range display 64 as illustrated or may be used suitably in a automatic guidance system or a collision avoidance system for the helicopter.

The signal on line 208 representative of cosine $\theta$, is derived from the signal on line 92 representative of elevation angle $\theta$. Particularly, as can be seen in FIG. 9, a function generator 214 is provided for converting the signal on line 92 representative of elevation angle $\theta$ to a signal on line 216 representative of the sine thereof. The sine $\theta$ signal on line 216 is delivered to a square circuit 218 which provides a signal on line 220 representative of $\sin^2\theta$. This signal is substracted from a constant equal to one by the subtracting circuit 222 to yield a signal representative of $1-\sin^2\theta$, which is geometrically equal to $\cos^2\theta$. A circuit 226 yields the square root of the signal on line 224 to provide a signal on line 208 representative of cosine $\theta$ to be used by the multiplying circuit 210. It will be appreciated that a generator receiving the signal on line 92 may generate a cosine $\theta$ signal directly. The system described above is preferred since, if the elevation determining circuit failed, a signal equal to 1 would be provided at line 208 resulting in a range display of uncorrected range. If a function generator which converted the signal on line 92 directly to a cosine where utilized, failure of the elevation determining circuit could result in a zero signal which would accordingly result in no range display. In this regard, it will be appreciated that a signal representative of uncorrected range is more appropriate for most emergency purposes than no range indication whatsoever.

Corrected bearing or azimuth to the remote transmitting antenna 44 is accomplished using the signal on output lines 138 and 140 of the logic and interval measuring circuits 136. A summing amplifier 228 receives a signal on line 138 representative of $\phi$ with respect to event I and a signal representative of $-\delta_A$ on line 230, obtained by dividing the signal on line 140 in half by a divider circuit 232. The summing amplifier 228 provides a signal on line 234 representative of $\phi - \delta_A$ which, in accordance with equation 28, is equal to corrected bearing or azimuth to the remote transmitting antenna 44. The signal on line 234 may be used by a bearing or azimuth display 62 as illustrated or by an automatic guidance system or collision avoidance system.

It will now be appreciated that the present invention provides an unique system for determining the position of a helicopter with respect to a remote transmitting antenna, and particularly, one that efficiently and accurately determines range, bearing and elevation with respect to the remote transmitting antenna using an inherent operating feature of the helicopter, i.e., a relatively large rotating member. Moreover, a system is provided for measuring and correcting maneuver induced errors in range, bearing and elevation. More particularly, the four rotational intervals between the events of maximum positive, maximum negative, and zero doppler frequency shift are measured and compared to determine maneuver induced errors in bearing and range determinations with acceptable approximations to yield highly suitable signals for use in a formation flight system, an automatic control system, a collision avoidance device, a landing aid, or the like.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

I claim:

1. A system for determining range to a remote antenna transmitting a signal comprising:
an antenna for said system for receiving said transmitted signal being displaced from and mounted for rotation about a predetermined axis to superimpose a doppler shift on said signal; and
means for detecting the doppler shift of said received signal with respect to the rotation of said antenna about said axis to determine said range.

2. A system for determining range according to claim 1 wherein said means detecting the doppler shift of said received signal includes means for detecting the asymmetry of the doppler shift of said received signal with respect to the rotation of said antenna about said axis to determine said range.

3. A system for determining range according to claim 2 wherein said means for detecting the asymmetry of said doppler shifted signal includes means for detecting at least two of the events of: Maximum positive doppler shift, maximum negative doppler shift, and zero doppler shift with increasing received signal frequency, and zero doppler shift with decreasing received signal frequency.

4. A system for determining range according to claim 4 wherein said means for detecting the asymmetry of said doppler shifted signal includes means for comparing two rotational intervals each being between two of said events, the first of said rotational interval being related to the rotational interval between the sequential occurrences of maximum positive doppler shift and maximum negative doppler shift, and the second of said rotational intervals being related to the rotational intervals between the sequential occurrences of maximum negative doppler shift and maximum positive doppler shift.

5. A system for determining range according to claim 3 wherein said means for detecting the asymmetry of said doppler shifted signal includes means for comparing two rotational intervals each being between two of said events, said first rotational interval is the rotational interval between the events of zero doppler shift with increasing received signal frequency and maximum positive doppler shift, and said second rotational interval is the rotational interval between the events of maximum positive doppler shift and zero doppler shift with decreasing received signal frequency.

6. A system for determining range according to claim 3 wherein said predetermined axis is maneuverable with respect to said remote antenna and wherein said means for detecting the asymmetry of said doppler shifted signal, includes means for comparing at least three intervals between said events to determine said range with compensation for errors due to said maneuver.

7. A system for determining range according to claim 6 wherein said means for comparing at least three intervals include means for comparing a first interval between the events of zero doppler shift with increasing received signal frequency and maximum positive doppler shift, a second rotational interval between the events of maximum positive doppler shift and zero doppler shift with decreasing received signal frequency, and a third interval being between the events of zero doppler shift with decreasing received signal frequency and maximum negative doppler shift.

8. A system for determining range according to claim 7 wherein said means for comparing at least three intervals between said events for said range compensated for maneuver error includes means for comparing said first and second intervals and said second and third intervals.

9. A system for determining range according to claim 8 wherein said means for comparing said first and second intervals and said second and third intervals for said range compensated for maneuver error includes means for summing of said first and second interval comparison and said second and third interval comparison.

10. A system for determining range according to claim 1 further including a second receiving antenna generally fixed with respect to said axis for providing a second received signal for comparison with said doppler shifted signal to provide an indication of said doppler shift.

11. The system of claim 1 wherein said means for detecting the doppler shift of said received signal with respect to the rotation of said antenna about said axis includes;
peak detecting means receiving said doppler shifted signal for providing a signal representative of the events of maximum positive doppler shift and maximum negative doppler shift; and
means for comparing at least two rotational intervals between said events, the first of said rotational intervals being related to the rotational interval between the sequential occurrences of maximum negative doppler shift and maximum positive doppler shift, and the second of said rotational intervals being related to the rotational intervals between the sequential occurrences of maximum positive doppler shift and maximum negative doppler shift;
and further includes zero detecting means receiving said doppler shifted signal for providing a signal representative of the events of zero doppler shift with increasing received signal frequency and zero doppler shift with decreasing received signal frequency.

12. The system of claim 1 wherein said means for detecting the doppler shift of said received signal with respect to the rotation of said antenna about said axis includes;

peak detecting means receiving said doppler shifted signal for providing a signal representative of the events of maximum positive doppler shift and maximum negative doppler shift;

zero detecting means receiving said doppler shifted signal for providing a signal representative of the events of zero doppler shift with increasing received signal frequency and zero doppler shift with decreasing received signal frequency; and means for comparing at least two rotational intervals between said events, said first rotational interval is the rotational interval between the events of zero doppler shift with increasing received signal frequency and maximum positive doppler shift, and said second rotational interval is the rotational interval between the events of maximum positive doppler shift and zero doppler shift with decreasing received signal frequency.

13. A system for a helicopter including a body and blade rotatable about an axis for determining range to a remote antenna transmitting a signal comprising:

an antenna for receiving said transmitted signal mounted on said blade and displaced from said axis for superimposing a doppler shift on said received signal;

an antenna generally fixed to said helicopter body for receiving said transmitted signal;

means operatively associated with said blade for detecting the rotational position of said blade;

means receiving said signals received by said blade mounted antenna and said body fixed antenna for comparing said signals to provide a signal representative of at least two of the events of maximum positive doppler shift, maximum negative doppler shift, and zero doppler shift with increasing received signal frequency, and zero doppler shift with decreasing received signal frequency; and means responsive to said signal representative of at least two events and said blade associated means for determining range to said remote transmitting antenna.

14. A system for determining range according to claim 13 wherein said means for determining range includes means for comparing two rotational intervals each being between two of said events, the first of said rotational intervals being related to the rotational interval between the sequential occurrences of maximum positive doppler shift and maximum negative doppler shift, and the second of said rotational intervals being related to the rotational intervals between the sequential occurrences of maximum negative doppler shift and maximum positive doppler shift.

15. A system for determining range according to claim 13 wherein said means for determining range includes means for comparing two rotational intervals each being between two of said events, said first rotational interval being the rotational interval between the events of zero doppler shift with increasing received signal frequency and maximum positive doppler shift, and said second rotational interval being the rotational interval between the events of maximum positive doppler shift and zero doppler shift with decreasing received signal frequency.

16. A system for determining range according to claim 13 wherein said helicopter is maneuverable with respect to said remote antenna and wherein said means for determining range includes means for comparing at least three intervals between said events to determine said range with compensation for errors due to said maneuver.

17. A system for determining range according to claim 16 wherein said means for comparing at least three intervals includes first means for determining the rotational interval between the events of zero doppler shift with increasing received signal frequency and maximum positive doppler shift, second means for determining the rotational interval between the events of maximum positive doppler shift and zero doppler shift with decreasing received signal frequency, and third means for determining the rotational interval between the events of zero doppler shift with decreasing received signal frequency and maximum negative doppler shift.

18. A system for determining range according to claim 17 wherein said means for comparing at least three intervals between said events for said range compensated for maneuver error includes means for comparing said first and second intervals and means for comparing said second and third intervals.

19. A system for determining range according to claim 18 wherein said means for determining said range compensated for maneuver error includes means for summing said first and second interval comparison and said second and third interval comparison.

20. A system for compensating a determination of position of a maneuverable vehicle with respect to a remote antenna transmitting a signal for errors due to said maneuver comprising:

an antenna for said vehicle for receiving said transmitted signal being displaced from and mounted for rotation about a predetermined axis to superimpose a doppler shift on said signal;

means responsive to said doppler shifted signal for detecting and generating signals indicative of at least three of the events of maximum positive doppler shift, maximum negative doppler shift, zero doppler shift with increasing received signal frequency, and zero doppler shift with decreasing received signal frequency; and error compensating means responsive to the signals indicative of at least three events for detecting at least two rotational intervals, each being between two of said events, and for comparing said two rotational intervals for compensating for errors in position measurement due to maneuver of said vehicle.

21. A system according to claim 20 wherein said system includes means for determining the bearing from said vehicle to said remote antenna and wherein said error compensating means includes means for compensating for bearing errors due to maneuver of said vehicle.

22. A system according to claim 21 wherein said means for compensating for said bearing errors comprises means responsive to two rotational intervals for generating a difference signal;

means responsive to said difference signal for generating an error signal; and means responsive to said error signal for compensating said bearing determination.

23. A system according to claim 22 wherein said means for generating a difference signal comprises means for comparing a first interval between the events of maximum positive doppler shift and zero doppler shift with decreasing received signal frequency, and a second interval between the events of zero doppler shift with decreasing received signal frequency and maximum negative doppler shift.

24. A system according to claim 20 wherein said system includes means responsive to said doppler shifted signals for determining the range from said vehicle to said remote antenna and wherein said error compensating means includes means for compensating for range errors due to maneuver of said vehicle.

25. A system according to claim 24 wherein said means for compensating for said range error includes means responsive to at least two rotational intervals for generating a range error signal and means responsive to said intervals for error signal for correcting said range determination.

26. A system according to claim 25 wherein said means for generating said range error signal comprises means for comparing a first interval between the events of maximum positive doppler shift and zero doppler shift with decreasing received signal frequency, and a second interval between the events of zero doppler shift with decreasing received signal frequency and maximum negative doppler shift.

27. A system according to claim 25 wherein said position determination system further includes means for determining the elevation.

28. A system for determining range according to claim 27 wherein said means for determining range includes means for compensating said determined range according to said elevation determination.

29. A system according to claim 25 further including means for determining bearing from said vehicle to said remote antenna and wherein said error compensating means includes means responsive to said doppler shifted signals for compensating for bearing errors due to maneuver of said vehicle.

30. A system according to claim 29 wherein said means for compensating for said bearing error comprises means responsive to only two rotational intervals for generating a difference signal; means responsive to said difference signal for generating an error signal; and means responsive to said error signal for error compensating said bearing determination.

31. A system according to claim 30 wherein said means for generating a difference signal comprises means for comparing a first interval between the events of maximum positive doppler shift and a zero doppler shift with a decreasing received signal frequency and a second interval between the events of zero doppler shift with decreasing received signal frequency and a maximum negative doppler shift.

32. A system for a helicopter including a body and blade rotatably mounted about an axis for determining bearing to a remote antenna transmitting a signal comprising:

an antenna for receiving said transmitted signal mounted on said blade and displaced from said axis for superimposing a doppler shift on said received signal;

means for detecting the doppler shift of said received signal to determine bearing to said remote antenna; and means for detecting the asymmetry of said doppler shift with respect to the rotation of said antenna about said axis to compensate said bearing determination for maneuver of said helicopter with respect to said remote antenna.

* * * * *